US008116561B2

(12) United States Patent
Hayase

(10) Patent No.: US 8,116,561 B2
(45) Date of Patent: Feb. 14, 2012

(54) COLOR PROCESSING APPARATUS AND METHOD

(75) Inventor: Yosuke Hayase, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 937 days.

(21) Appl. No.: 12/125,785

(22) Filed: May 22, 2008

(65) Prior Publication Data
US 2008/0298677 A1 Dec. 4, 2008

(30) Foreign Application Priority Data
May 28, 2007 (JP) ................................ 2007-140561

(51) Int. Cl.
G06K 9/00 (2006.01)
(52) U.S. Cl. ........................................ 382/162; 382/167
(58) Field of Classification Search .......... 382/162–167; 358/1.9, 518–539; 345/589–604
See application file for complete search history.

(56) References Cited

U.S. PATENT DOCUMENTS

| 6,778,185 | B1 * | 8/2004 | Moroney | 345/590 |
|---|---|---|---|---|
| 6,873,727 | B2 * | 3/2005 | Lopez et al. | 382/162 |
| 6,995,865 | B1 * | 2/2006 | Motomura | 358/1.9 |
| 7,015,929 | B2 | 3/2006 | Satomi et al. | |
| 7,095,529 | B2 * | 8/2006 | Krueger et al. | 358/1.9 |
| 7,379,207 | B2 * | 5/2008 | Harrington | 358/1.9 |
| 7,573,620 | B2 * | 8/2009 | Presley et al. | 358/518 |
| 7,653,239 | B2 * | 1/2010 | Makino | 382/162 |
| 7,911,665 | B1 * | 3/2011 | Borg | 358/518 |
| 7,920,308 | B2 * | 4/2011 | Kumada et al. | 358/518 |

FOREIGN PATENT DOCUMENTS
JP 2002-171418 A 6/2002
* cited by examiner

Primary Examiner — Ishrat I Sherali
(74) Attorney, Agent, or Firm — Canon U.S.A., Inc., I.P Division

(57) ABSTRACT

A color processing apparatus includes an input conversion unit configured to convert input data expressed in an input device-dependent color space into data expressed in a device-independent color space, a determination unit configured to determine an attribute of the input data and transmit a result of the determination to a color gamut mapping unit and an output conversion unit. The color gamut mapping unit is configured to perform color gamut mapping on data expressed in the device-independent color space to data corresponding to color gamut information of an output device based on a result of the determination. The output conversion unit is configured to convert the data which is subjected to the color gamut mapping into output data which is expressed in an output device-dependent color space based on a result of the determination.

8 Claims, 22 Drawing Sheets

FIG.4

| PRIMARY COLOR/ SECONDARY COLOR IDENTIFICATION FLAG (401) | DATA VALUE (402) |
|---|---|
| None | 0x00 |
| R | 0x01 |
| Y | 0x02 |
| G | 0x04 |
| C | 0x08 |
| B | 0x10 |
| M | 0x20 |
| K | 0x40 |
| W | 0x80 |
| W-R | W\|R |
| K-R | K\|R |
| W-Y | W\|Y |
| K-Y | K\|Y |
| W-G | W\|G |
| K-G | K\|G |
| W-C | W\|C |
| K-C | K\|C |
| W-B | W\|B |
| K-B | K\|B |
| W-M | W\|M |
| K-M | K\|M |
| R-Y | R\|Y |
| Y-G | Y\|G |
| G-C | G\|C |
| C-B | C\|B |
| B-M | B\|M |
| M-R | M\|R |
| W-R-Y | W\|R-Y |
| K-R-Y | K\|R-Y |
| W-Y-G | W\|Y-G |
| K-Y-G | K\|Y-G |
| W-G-C | W\|G-C |
| K-G-C | K\|G-C |
| W-C-B | W\|C-B |
| K-C-B | K\|C-B |
| W-B-M | W\|B-M |
| K-B-M | K\|B-M |
| W-M-Y | W\|M-Y |
| K-M-Y | K\|M-Y |

FIG.5

| 501 PRIMARY COLOR/ SECONDARY COLOR FILTER | 502 FLAG ENABLED BY FILTER SETTING |
|---|---|
| F(W-R) | W, R, W-R |
| F(W-Y) | W, C, W-C |
| F(W-G) | W, G, W-G |
| F(W-C) | W, C, W-C |
| F(W-B) | W, B, W-B |
| F(W-M) | W, M, W-M |
| F(W-R-Y) | R-Y, W-R-Y |
| F(W-Y-G) | Y-G, W-Y-G |
| F(W-G-C) | G-C, W-G-C |
| F(W-C-B) | C-B, W-C-B |
| F(W-B-M) | B-M, W-B-M |
| F(W-M-Y) | M-Y, W-M-Y |

FIG.18

| R | G | B | J | a | b |
|---|---|---|---|---|---|
| 0 | 0 | 255 | 26 | -19 | -65 |
| 32 | 32 | 255 | 38 | -17 | -60 |
| 64 | 64 | 255 | 46 | -14 | -57 |
| ... | ... | ... | ... | ... | ... |
| 224 | 224 | 255 | 90 | -2 | -7 |
| 255 | 255 | 255 | 100 | 0 | 0 |

FIG.20

| PRIMARY COLOR/ SECONDARY COLOR FILTER | FLAG ENABLED BY FILTER SETTING |
|---|---|
| F(W-R) | W, R, W-R |
| F(W-Y) | W, C, W-C |
| F(W-G) | W, G, W-G |
| F(W-C) | W, C, W-C |
| F(W-B) | W, B, W-B |
| F(W-M) | W, M, W-M |
| F(W-R-Y) | R-Y, W-R-Y |
| F(W-Y-G) | Y-G, W-Y-G |
| F(W-G-C) | G-C, W-G-C |
| F(W-C-B) | C-B, W-C-B |
| F(W-B-M) | B-M, W-B-M |
| F(W-M-Y) | M-Y, W-M-Y |
| F(K-R) | K, R, K-R |
| F(K-Y) | K, C, K-C |
| F(K-G) | K, G, K-G |
| F(K-C) | K, C, K-C |
| F(K-B) | K, B, K-B |
| F(K-M) | K, M, K-M |
| F(K-R-Y) | R-Y, K-R-Y |
| F(K-Y-G) | Y-G, K-Y-G |
| F(K-G-C) | G-C, K-G-C |
| F(K-C-B) | C-B, K-C-B |
| F(K-B-M) | B-M, K-B-M |
| F(K-M-Y) | M-Y, K-M-Y |

FIG.21

| R | G | B | J | a | b |
|---|---|---|---|---|---|
| 0 | 0 | 0 | 0 | 0 | 0 |
| 0 | 0 | 32 | 6 | 0 | -13 |
| 0 | 0 | 64 | 15 | -2 | -24 |
| ... | ... | ... | ... | ... | ... |
| 0 | 0 | 255 | 26 | -19 | -65 |
| 32 | 32 | 255 | 38 | -17 | -60 |
| 64 | 64 | 255 | 46 | -14 | -57 |
| ... | ... | ... | ... | ... | ... |
| 224 | 224 | 255 | 90 | -2 | -7 |
| 255 | 255 | 255 | 100 | 0 | 0 |

FIG.22

| PRIMARY COLOR/ SECONDARY COLOR IDENTIFICATION FLAG (2201) | DATA VALUE (2202) |
|---|---|
| None | 0x00 |
| R | 0x01 |
| Y | 0x02 |
| G | 0x04 |
| C | 0x08 |
| B | 0x10 |
| M | 0x20 |
| K | 0x40 |
| W | 0x80 |
| W-R | W\|R |
| K-R | K\|R |
| W-Y | W\|Y |
| K-Y | K\|Y |
| W-G | W\|G |
| K-G | K\|G |
| W-C | W\|C |
| K-C | K\|C |
| W-B | W\|B |
| K-B | K\|B |
| W-M | W\|M |
| K-M | K\|M |
| R-Y | R\|Y |
| Y-G | Y\|G |
| G-C | G\|C |
| C-B | C\|B |
| B-M | B\|M |
| M-R | M\|R |
| W-R-Y | W\|R-Y |
| K-R-Y | K\|R-Y |
| W-Y-G | W\|Y-G |
| K-Y-G | K\|Y-G |
| W-G-C | W\|G-C |
| K-G-C | K\|G-C |
| W-C-B | W\|C-B |
| K-C-B | K\|C-B |
| W-B-M | W\|B-M |
| K-B-M | K\|B-M |
| W-M-Y | W\|M-Y |
| K-M-Y | K\|M-Y |
| W-M-R-Y | W\|M-R\|R-Y |
| K-M-R-Y | K\|M-R\|R-Y |
| W-Y-G-C | W\|Y-G\|G-C |
| K-Y-G-C | K\|Y-G\|G-C |
| W-C-B-M | W\|C-B\|B-M |
| K-C-B-M | K\|C-B\|B-M |

COLOR PROCESSING APPARATUS AND METHOD

BACKGROUND OF THE INVENTION

1. Field of the Invention

The present invention relates to an apparatus configured to perform color matching and a color matching method.

2. Description of the Related Art

FIG. 24 is a conceptual diagram of a common color matching. Input data, which is input device-independent data, for example, RGB data, is converted into data in XYZ values in a device-independent color space according to a profile of the input data. Since an output device cannot express colors which are not within a color gamut of the output device, a color gamut mapping is performed on the input data, which is converted into data of the device-independent color space so that any color is expressed in the color gamut of the output device. In the color gamut mapping, the data of the device-independent color space is converted into data of output device-dependent color space which is, for example, CMYK data.

The input device is, for example, a scanner, a digital camera, or a display. The output device is, for example, a printer.

FIG. 24 illustrates a color matching process performed by software called a color management system. Generally, ICC profiles defined by International Color Consortium (ICC) are used to describe color attributes of input and output devices. The ICC profiles include data indicating a relationship between a device-dependent color space and a device-independent color space (Profile Connection Space (PCS)) defined in a matrix or a look-up table (LUT). The widespread use of the ICC profiles has contributed to realization of easy color matching between the input and output devices.

Although the color matching using the ICC profile is highly convenient, undesirable results can appear in some cases. For example, while a monitor serving as an input device displays a color of pure yellow, a printer serving as an output device may produce a color that is not the pure color yellow but a mixture of different colors as a result of the color matching. The difference may be unnoticeable if the output data is a photo image. However, if the output data is text, which is generally expressed using a pure color, or vector data of graphics, the difference becomes noticeable.

Thus, in order to prevent output of an impure color with respect to an input of a primary color which is a color expressed by one color material such as yellow, cyan, or magenta, processing called "primary color compensation" is applied to the input data. In addition, processing called "secondary color secondary color compensation" is applied to an output of a secondary color which is expressed by mixing two primary colors, that is, red, green, and blue.

Japanese Patent Application Laid-Open No. 2002-171418 and U.S. Pat. No. 7,015,929 discuss compensation processing of the primary and the secondary colors. According to a technique discussed in Japanese Patent Application Laid-Open No. 2002-171418, if a color signal value of any input data is 0%, the input data is converted so that a corresponding color signal value of the output data becomes 0%. Further, according to a technique discussed in U.S. Pat. No. 7,015,929, pure color can be output also as to a color that is not within a specified input profile by using color space characteristics data including hue correction information of the printer which is stored in advance.

However, according to the technique discussed in Japanese Patent Application Laid-Open No. 2002-171418, the color signal value of the output data that corresponds to the input data is corrected to be 0% only when the color signal value of the input data is 0%. Consequently, discontinuity of colors may occur between the corrected data and uncorrected data in the vicinity of the corrected data.

According to the technique discussed in U.S. Pat. No. 7,015,929, continuity of colors is achieved between a primary color or a secondary color which is compensated, and a color in the vicinity of the compensated color even if the color is not included in a certain input profile. However, since certain fixed hue correction data is used for all input data, optimum hue correction processing cannot be applied to an arbitrary input profile. Further, color space characteristics data including hue correction information is necessary for each printer and extra memory area is required.

Thus, in order to dynamically switch between application and non-application of the primary color/secondary color compensation, either of the two techniques has to be chosen. One technique gives priority to memory efficiency at the sacrifice of color continuity as discussed in Japanese Patent Application Laid-Open No. 2002-171418. The other technique realizes natural color continuity but requires data (profile) for both cases of the primary color/secondary color compensation and non-color compensation as discussed in U.S. Pat. No. 7,015,929.

SUMMARY OF THE INVENTION

The present invention is directed to a color processing apparatus which is capable of performing appropriate color conversion processing considering color continuity when an input device and an output device are arbitrarily combined, without preparing a plurality of profiles for one device in dynamically switching between application and non-application of a primary color/secondary color compensation.

According to an aspect of the present invention, a color processing apparatus includes an input conversion unit configured to convert input data expressed in an input device-dependent color space into data expressed in a device-independent color space, a determination unit configured to determine an attribute of the input data and transmit a result of the determination to a color gamut mapping unit and an output conversion unit. The color gamut mapping unit is configured to perform color gamut mapping on data expressed in the device-independent color space to data corresponding to color gamut information of an output device based on a result of the determination and the output conversion unit is configured to convert the data which is subjected to the color gamut mapping into output data which is expressed in an output device-dependent color space based on a result of the determination. The attribute is information which corresponds to a primary color or a secondary color.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of an identification flag of a primary color and a secondary color according to an exemplary embodiment of the present invention.

FIG. 5 illustrates an example of a primary color/secondary color filter.

FIG. 18 illustrates an example of primary ramp information included in device color gamut information.

FIG. 20 illustrates another example of a color filter of a primary color and a secondary color.

FIG. 21 illustrates another example of primary ramp information included in the device color gamut information.

FIG. 22 illustrates an example of the primary color/secondary color identification flag according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
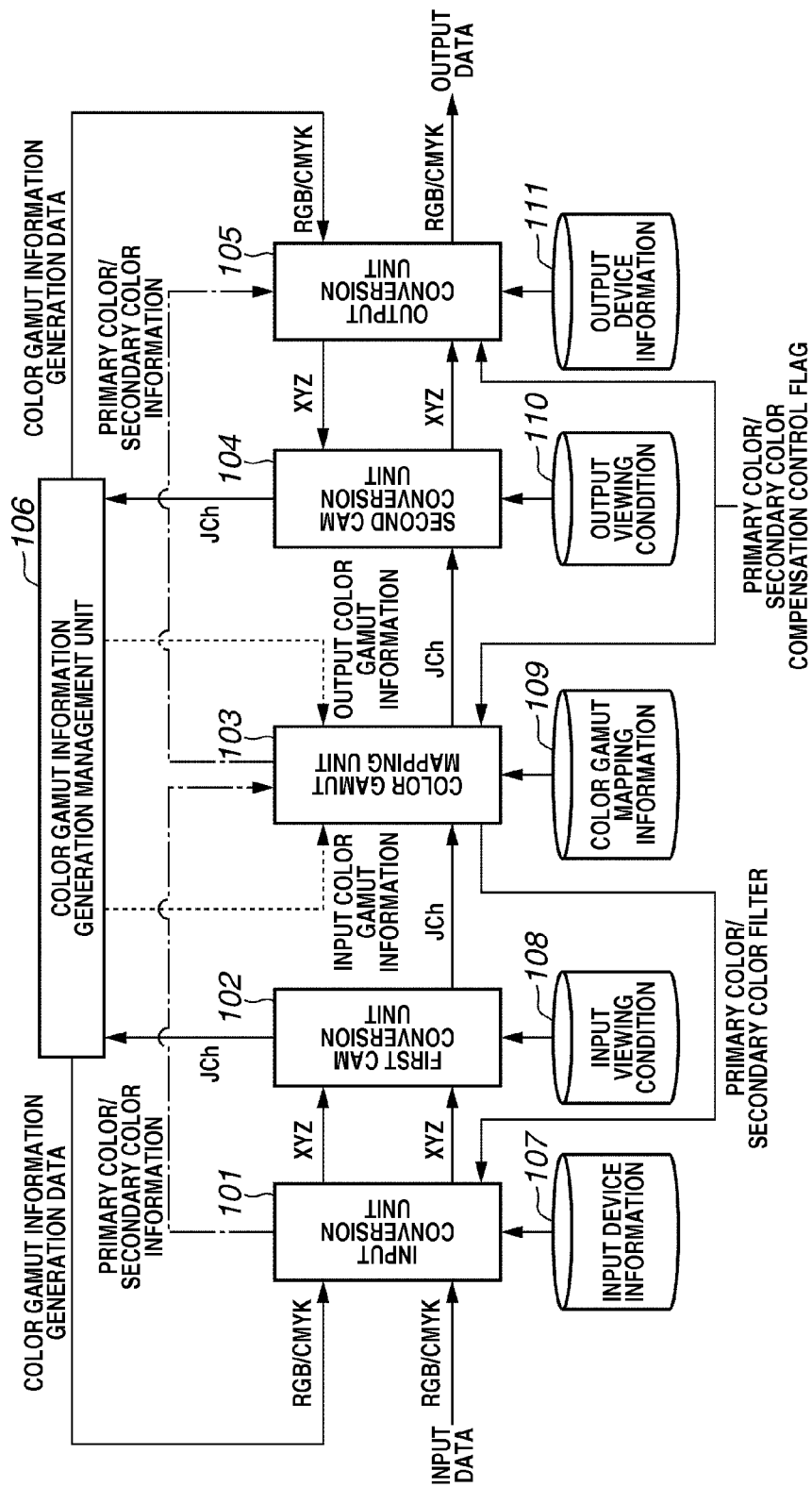
FIG. 1 is a block diagram illustrating an example of a functional configuration of a system according to an exemplary embodiment of the present invention.

FIG. 1 is a block diagram illustrating a configuration example of a color processing apparatus according to a first exemplary embodiment of the present invention.

According to the present exemplary embodiment, an attribute of input color data is determined and then a color gamut mapping and output conversion are dynamically performed based on the result of the determination. The output conversion and the color gamut mapping are controlled in association with each other. According to the present exemplary embodiment, a design concept of the output conversion matches a design concept of the color gamut mapping, thus a high-definition color reproduction can be achieved. Information related to a primary color or a secondary color is used as the attribute according to the present exemplary embodiment.

An input conversion unit 101 converts data in an input device-dependent color space in RGB values or CMYK values into data in a device-independent color space in XYZ values using input device information 107. The input device information 107 includes calorimetric value data describing a relation between color values of the input device in the RGB values or the CMYK values and color values of the device-independent color space in the XYZ values as well as various parameters. Further, the input conversion unit 101 sets a primary color/secondary color identification flag that corresponds to the input data according to a primary color/secondary color filter.

A first CAM conversion unit 102 performs forward conversion of the data in XYZ values into data in a color appearance space in, for example, JCh values based on a color appearance model (CAM) such as CIECAM02. A CAM parameter described in a first (input) viewing condition 108 is used at this time. The CAM parameter is a visual condition parameter necessary in a CAM conversion. The CAM parameter is, for example, tristimulus values XYZ of a white point in a viewing environment, absolute adapting luminance, background relative luminance, impact of surround, factor for degree of adaptation, chromatic induction factor, or lightness contrast factor. It is to be noted that the CAM of the present exemplary embodiment is not limited to CIECAM02 and a publicly known model such as RLAB or CIECAM97 may also be used. Further, the color appearance space data of the present exemplary embodiment is not limited to JCh and data of a different color space such as Jab or QMh may also be used.

A color gamut mapping unit 103 performs mapping of the JCh values in a color gamut of the output device by referring to color gamut information of the input device, color gamut information of the output device, and color gamut mapping information 109. The color gamut mapping information 109 includes various parameters used in the process of the color gamut mapping. Further, if a primary color/secondary color compensation control flag is "ON", then the primary color/secondary color filter described in the color gamut mapping information 109 is loaded by the color gamut mapping unit 103 and the input data is processed.

A second CAM conversion unit 104 performs inverse conversion of the input data in the color appearance space, for example, in JCh values into XYZ values using a CAM such as CIECAM02. At this time, the second CAM conversion unit 104 refers to a CAM parameter described in a second (output) viewing condition 110. Further, the second CAM conversion unit 104 performs forward conversion of the data in XYZ values, which is input as color gamut information generation data, into data in the color appearance space.

An output conversion unit 105 converts the data in XYZ values into data in the output device-dependent color space in RGB values or CMYK values by referring to output device information 111. The output device information 111 includes calorimetric value data which describes a relation between the RGB or the CMYK color values of the output device and the XYZ color values in the device-independent color space as well as various parameters. Further, the output conversion unit 105 converts data in RGB values or CMYK values in the output device-dependent color space which is input as the color gamut information generation data into data in XYZ values.

A color gamut information generation management unit 106 generates the color gamut information based on the JCh values that match the RGB values or the CMYK values of the color gamut information generation data. The color gamut information includes, for example, gamut boundary description (GBD) data, primary color data, gray line gradation data, and primary ramp data. The primary color data is data on RGBCMYWK (red, green, blue, cyan, magenta, yellow, white, and black) which are the primary and the secondary colors. The primary ramp data is gradation data between the primary colors.

Figure 2:
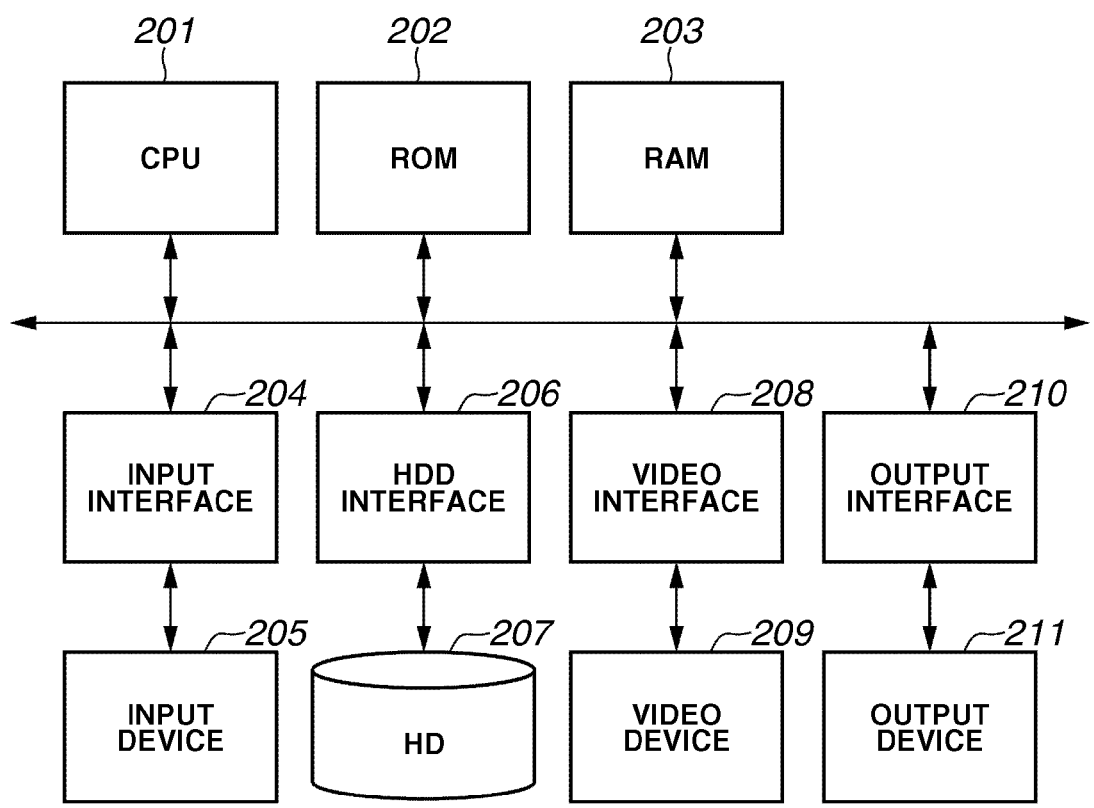
FIG. 2 is a block diagram illustrating an example of a system configuration according to an exemplary embodiment of the present invention.

FIG. 2 is a block diagram illustrating an example of a system configuration shown in FIG. 1.

A central processing unit (CPU) 201 controls overall operation of the color processing apparatus according to a program stored in a recording medium such as a read-only memory (ROM) 202 or a hard disk (HD) 207 and uses a random access memory (RAM) 203 as a work memory. According to the program stored in the recording medium, the CPU 201 executes various types of processing including color matching. An input interface 204 is used for connecting an input device 205 to a system bus. A hard disk interface 206 is used for connecting the HD 207 to the system bus. A video interface 208 is used for connecting a video device 209 to the system bus. An output interface 210 is used for connecting an output device 211 to the system bus.

The input device according to the present exemplary embodiment includes an image pickup apparatus such as a digital still camera or a digital video camera, as well as various types of image input apparatuses including an image reader such as an image scanner or a film scanner. The video device includes a display apparatus such as a color monitor. The color monitor is, for example, a cathode ray tube (CRT) or a liquid crystal display (LCD). Further, the output device includes an image output apparatus such as a color printer or a film recorder.

Further, a general-purpose interface can be used as the interface of the color processing apparatus. A serial interface, for example, RS232C, RS422, USB or IEEE1394 and a parallel interface, for example, SCSI or Centronics, can be selected depending on the usage.

Figure 3:
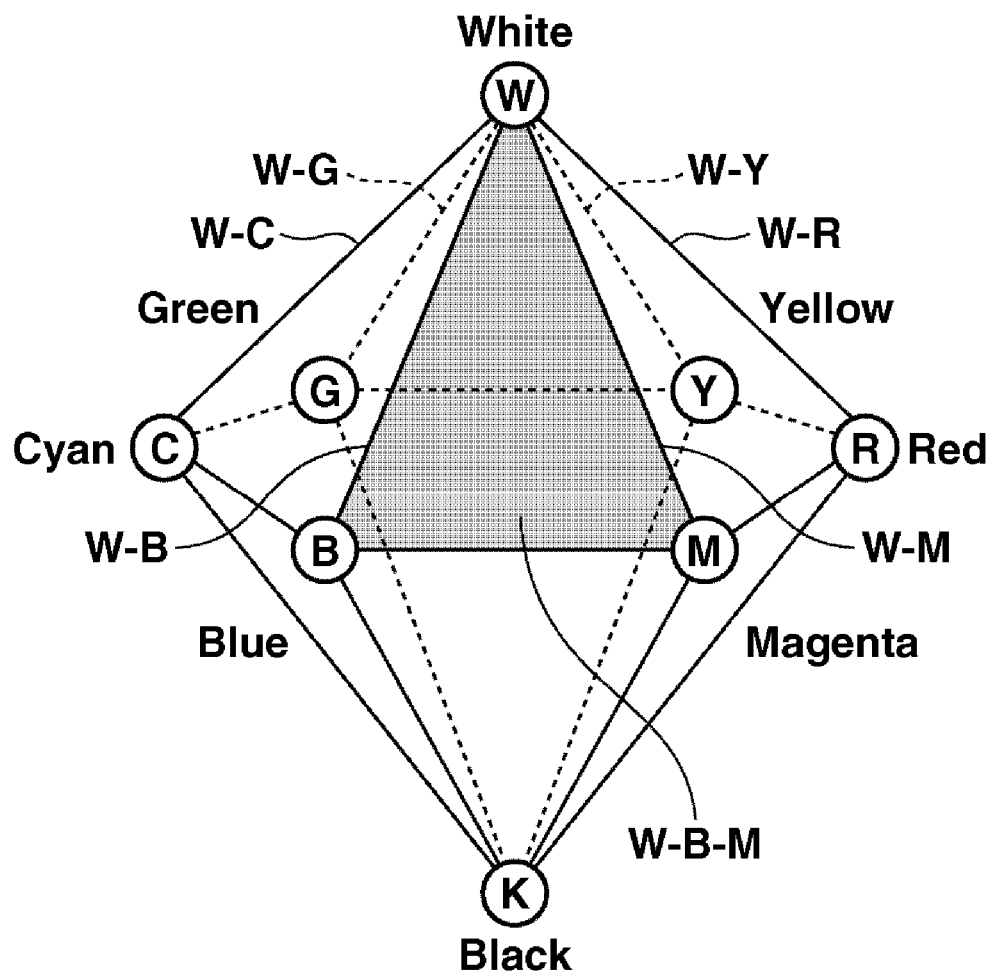
FIG. 3 illustrates a color gamut of a device color space.
Figure 6:
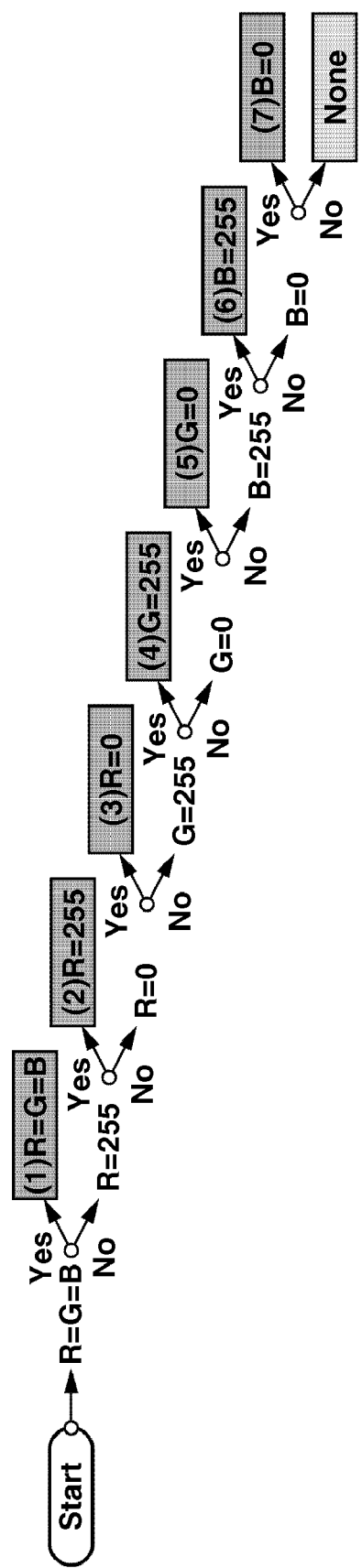
FIG. 6 illustrates a flow of a decision tree used to determine the primary color/secondary color identification flag illustrated in FIG. 4.
Figure 7:
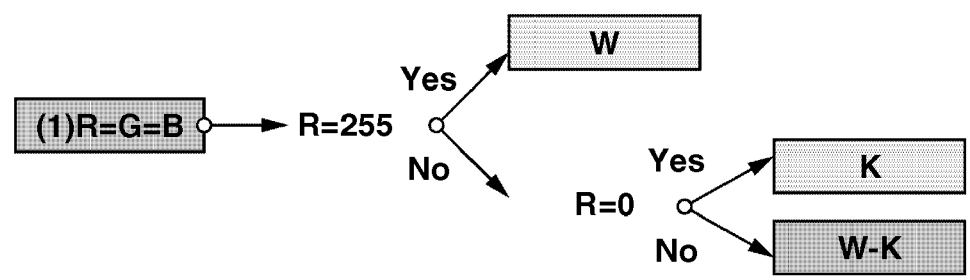
FIG. 7 illustrates a flow of a decision tree when R=G=B in FIG. 6.

FIG. 3 illustrates a color gamut of the device in the device color space. Red (R), green (G), blue (B), cyan (C), magenta (M), yellow (Y), white (W), and black (K) in FIG. 3 are primary colors of the device. According to the present exemplary embodiment, the primary color is a color expressed by any one color material among cyan, magenta, and yellow. In FIG. 3, the secondary color corresponds to "W-C" which is a color between white and cyan, "W-M" which is a color between white and magenta, or "W-Y" which is a color between white and yellow. Further, the secondary color is a color expressed by two color materials. In FIG. 3, the secondary color corresponds to "W-R" which is a color between white and red, "W-G" which is a color between white and green, "W-B" which is a color between white and blue, and "W-B-M" which is a color surrounded by white, magenta, and blue.

FIG. 4 illustrates an example of an identification flag or attribute information used for identifying a primary color or a secondary color according to the present exemplary embodiment. In FIG. 4, W, R, C, etc. of a primary color/secondary color identification flag 401 denote the same color as FIG. 3. The primary color/secondary color identification flag 401 has data value 402 that matches each flag. For example, 100% yellow is represented by a flag "Y" and its data value is "0x02". Halftone yellow is represented by a flag "W-Y" and its data value is "0x82" or a bit inclusive OR of data values of W and Y. Further, a halftone color between yellow and cyan is represented by a flag "W-G", "W-Y-G", or "W-G-C". Data value of "W-G" is "0x84" or a bit inclusive OR of data values of W and G. Data value of "W-Y-G" is "0x86" or a bit inclusive OR of data values of W, Y, and G. Data value of "W-G-C" is "0x8C" or a bit inclusive OR of data values of W, G, and C.

Further, a "None" flag with a data value of "0x00" is set for a color other than the primary color or the secondary color or for a color which does not require identification. The primary color/secondary color identification flag is uniquely identified according to a value of the input data. The relation between the flag and the data value is written directly into, for example, program code of the input conversion unit 101 used for setting the primary color/secondary color identification flag, the color gamut mapping unit 103 used for determining the primary color/secondary color identification flag, or the output conversion unit 105. Further, each conversion unit may refer to the data values which are written in a processing unit used for controlling the color matching.

FIGS. 6 to 13 show decision trees used for the determination of the primary color/secondary color identification flag about the data in RGB values. First, in FIG. 6, the RGB values are examined whether R=G=B. If R=G=B, the process proceeds to (1) in FIG. 7. If not, the RGB values are examined whether R=255. If R=255, the process proceeds to (2) in FIG. 8. If not, then the RGB values are examined whether R=0. If R=0, the process proceeds to (3) in FIG. 9. If not, then the RGB values are examined whether G=255. If G=255, the process proceeds to (4) in FIG. 10. If not, then the RGB values are examined whether G=0. If G=0, the process proceeds to (5) in FIG. 11. If not, then the RGB values are examined whether B=255. If B=255, the process proceeds to (6) in FIG. 12. If not, then the RGB values are examined whether B=0. If B=0, the process proceeds to (7) in FIG. 13. If not, then the "None" flag is selected.

Figure 8:
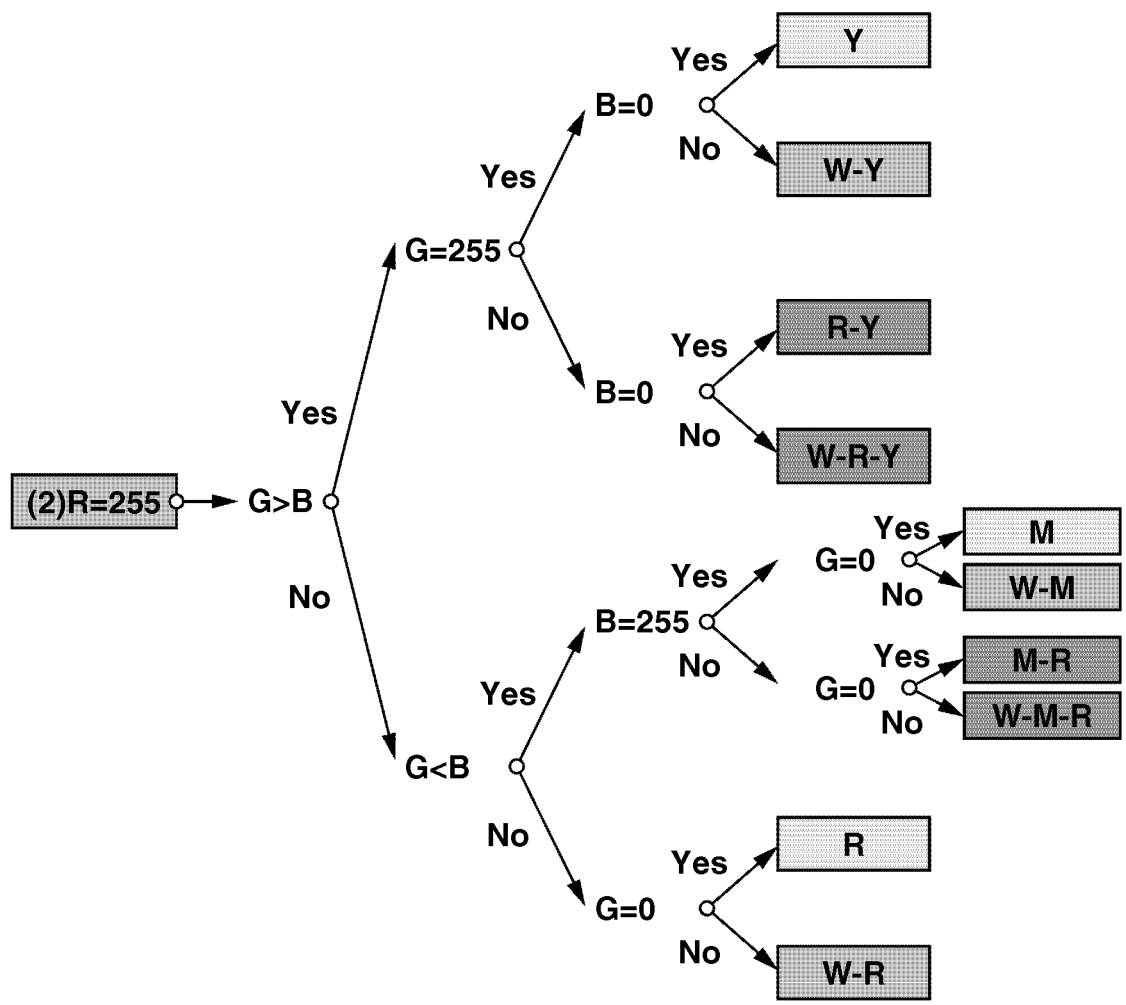
FIG. 8 illustrates a flow of a decision tree when R=255 in FIG. 6.
Figure 9:
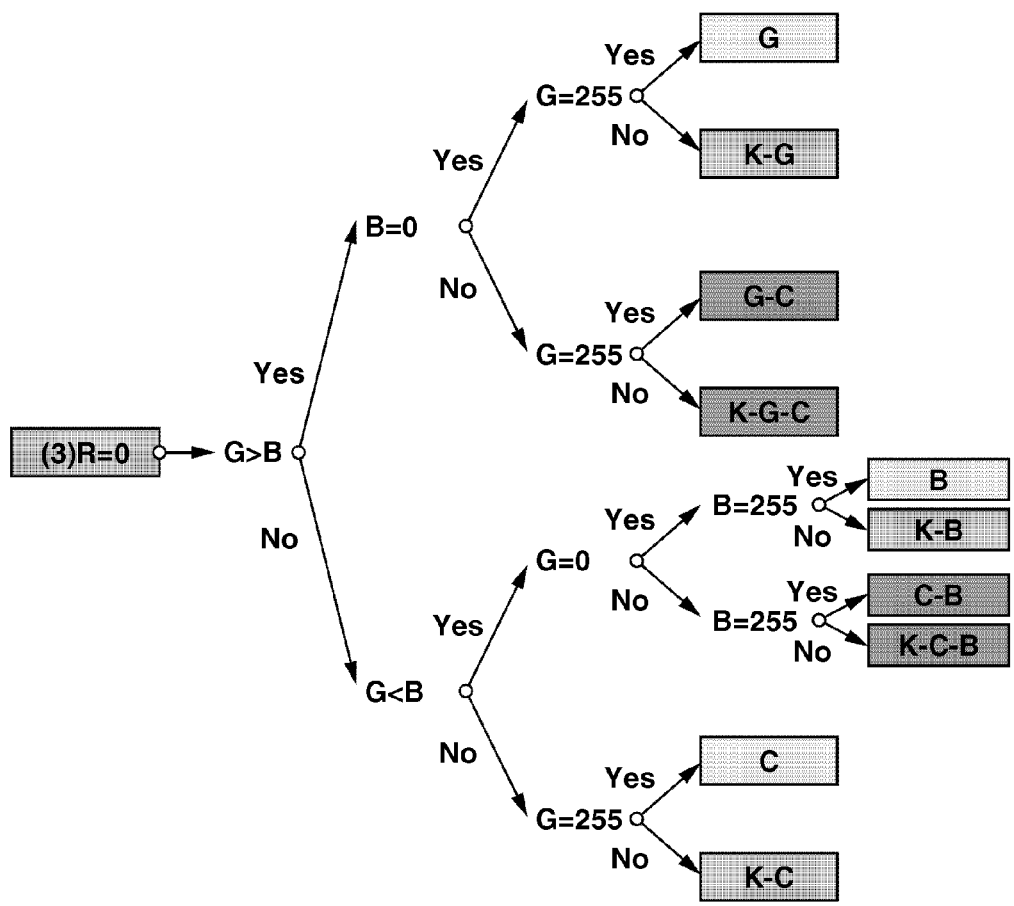
FIG. 9 illustrates a flow of a decision tree when R=0 in FIG. 6.
Figure 10:
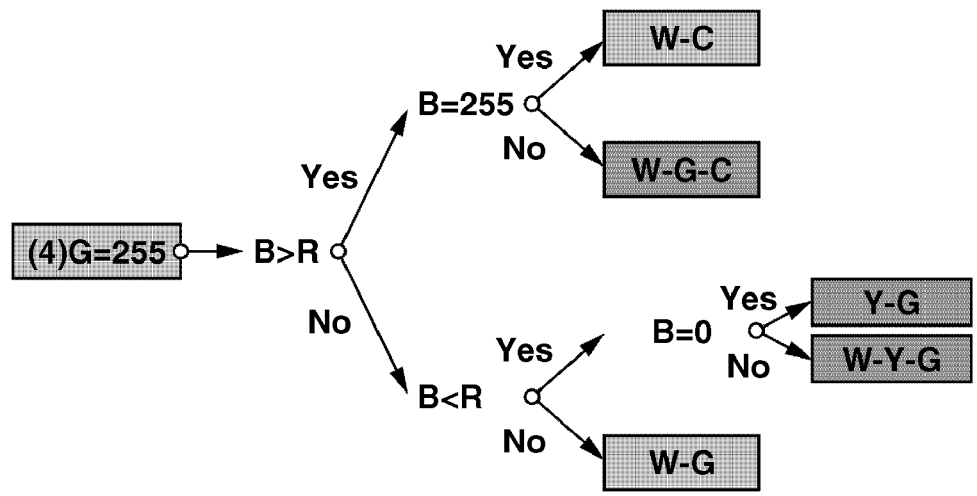
FIG. 10 illustrates a flow of a decision tree when G=255 in FIG. 6.
Figure 11:
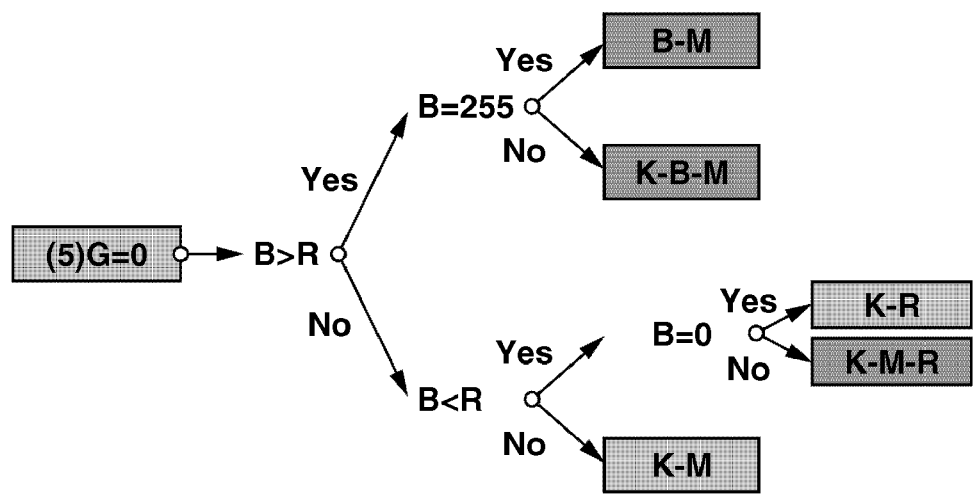
FIG. 11 illustrates a flow of a decision tree when G=0 in FIG. 6.
Figure 12:
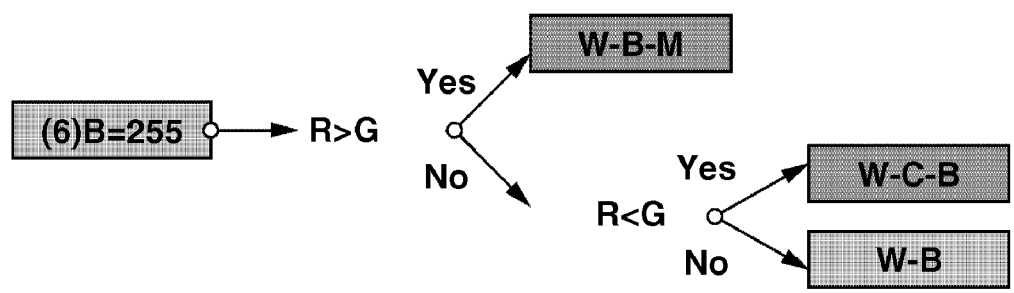
FIG. 12 illustrates a flow of a decision tree when B=255 in FIG. 6.
Figure 13:
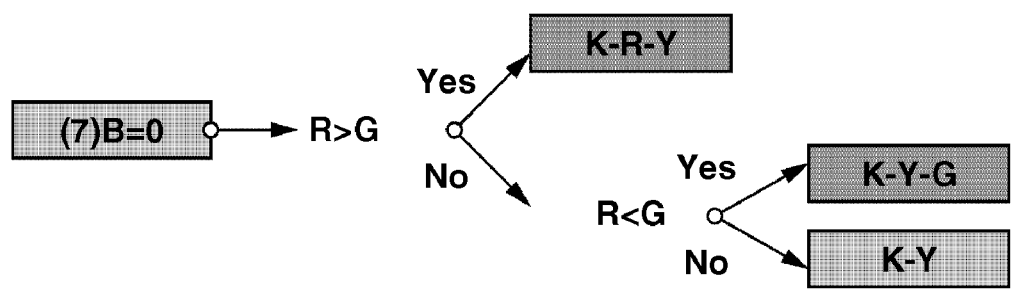
FIG. 13 illustrates a flow of a decision tree when B=0 in FIG. 6.

As an example, the RGB values are R=255, G=255, and B=0 (i.e. primary color of yellow). First, the RGB values are examined whether R=G=B according to FIG. 6. Since the RGB values are not R=G=B, the RGB values are examined whether R=255. Since R=255, the process proceeds to (2) in FIG. 8. In FIG. 8, the RGB values are examined whether G>B. Since G>B, the RGB values are examined whether G=255. Since G=255, the RGB values are further examined whether B=0. Since B=0, the RGB values are determined to match a primary color/secondary color identification flag 401 of "Y" (i.e., primary color of yellow). In this way, a unique identification flag is identified for arbitrary RGB values. Further, a primary color/secondary color identification flag 401 for the CMYK values can be selected using similar decision trees.

FIG. 5 illustrates an example of a primary color/secondary color filter according to the present exemplary embodiment. A primary color/secondary color filter 501 includes twelve types of filters relating to white primary color. Each filter has a primary color/secondary color identification flag 502 that matches the filter. The primary color/secondary color filter is used for individually specifying which primary color or secondary color is to be compensated. The primary color/secondary color filter is included in the color gamut mapping information 109. By referring to the primary color/secondary color filter, the color gamut mapping unit 103 determines which of the primary colors or the secondary colors is to be compensated before the mapping processing. Accordingly, appropriate mapping processing considering continuity of the color which is to be compensated and other colors in the vicinity of the color becomes possible. The primary color/secondary color filter can be written in the color gamut mapping information and specified but can be also specified externally by an application.

FIG. 18 illustrates an example of primary ramp information used in the present exemplary embodiment. Primary ramp information from blue to white is illustrated in FIG. 18. The primary ramp information includes gradation data between white primary and RGBCMY (red, green, blue, cyan, magenta, and yellow) primaries. Device values 1801 match color appearance space values 1802 in Jab values in the primary ramp information. The color gamut mapping unit 103 can appropriately map a primary color or a secondary color of the input device to a hue of a primary color or a secondary color of the output device using the primary ramp information included in the color gamut information of the device.

Figure 14:
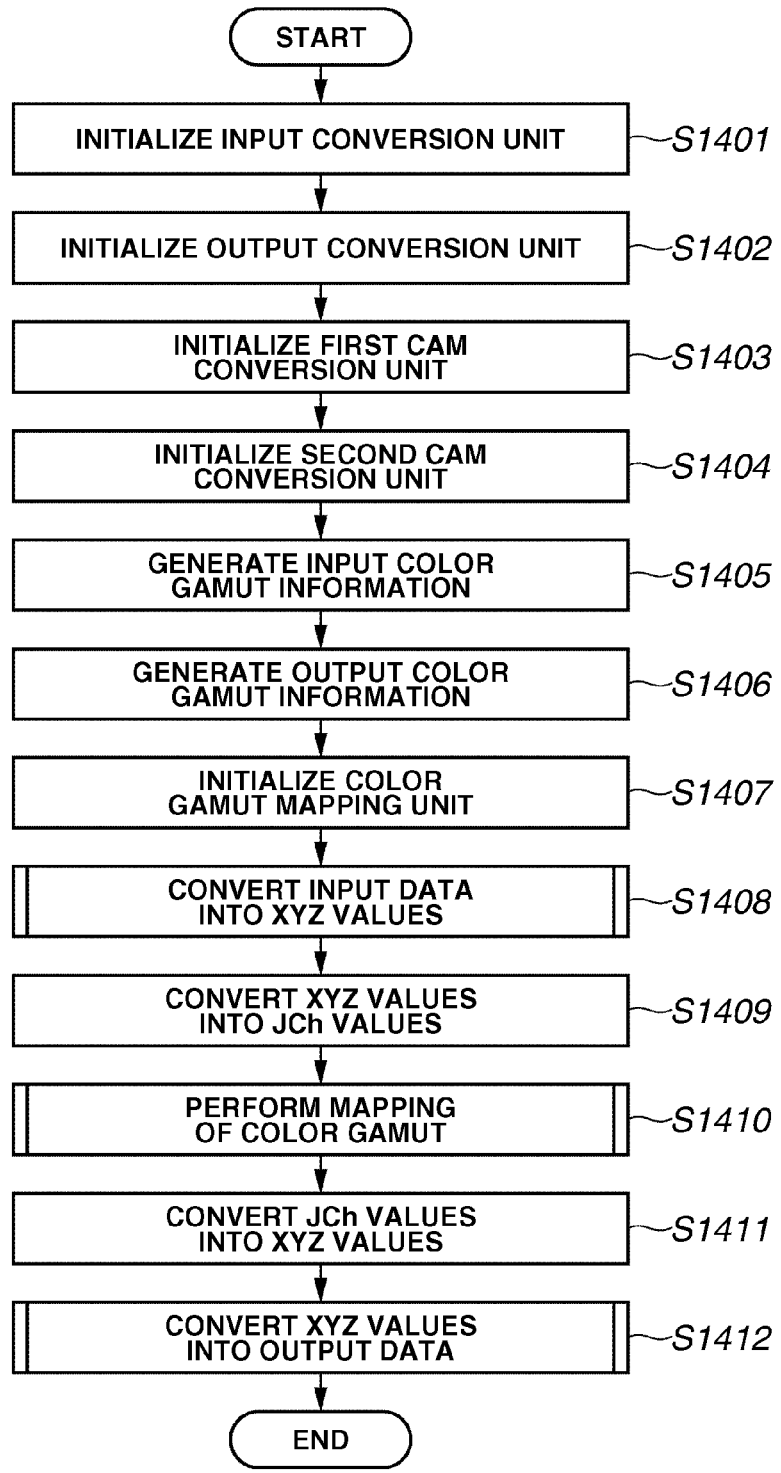
FIG. 14 is a main flowchart illustrating a flow of image processing according to an exemplary embodiment of the present invention.

FIG. 14 is a main flowchart of the color processing apparatus according to the present exemplary embodiment. According to the present exemplary embodiment, the input device is a monitor (RGB) and the output device is a printer (CMYK).

First, in step S1401, the CPU 201 initializes the input conversion unit 101. In this step, the CPU 201 loads the input device information 107 and generates a conversion definition of the RGB values of the input device into the XYZ values. The input device information 107 includes information about a relation between the RGB values of the input device and XYZ values. The XYZ values are obtained by displaying the signals of the device values on the monitor and measuring them with a calorimetric apparatus. According to the relation between the RGB values and the XYZ values, a conversion definition from the RGB values to the XYZ values can be generated by a known technique such as matrix operation or γ correction.

Next, in step S1402, the CPU 201 initializes the output conversion unit 105. In this step, the CPU 201 loads the output device information 111 and the primary color/secondary color compensation control flag and generates a conversion definition of the XYZ values to RGB values of the output device. The primary color/secondary color compensation control flag is used for determining whether to compensate the primary color or the secondary color. The primary color/secondary color compensation control flag is specified by an application, etc.

Further, the output device information 111 includes information about a relation between CMYK values of the output device and XYZ values obtained by measuring a print sample, which is signals of the CMYK values printed on a paper, with a calorimetric apparatus. Based on the output device information 111, a conversion definition of XYZ values into CMYK values is generated using, for example, an iterative method. At this time, if the primary color/secondary color compensation control flag is "ON" (primary color and secondary color compensation is to be performed), the XYZ values of data which is specified as the primary color or the secondary color is converted into CMYK values of the specified primary color or secondary color. Further, a conversion definition of CMYK values into XYZ values is generated by a known technique such as tetrahedron compensation. This definition is used for generating the output color gamut information.

Next, in step S1403, the CPU 201 initializes the first CAM conversion unit 102. In this step, the CPU 201 loads an input viewing condition 108 and generates a conversion definition from XYZ values into JCh values by a forward conversion according to CIECAM02.

Next, in step S1404, the CPU 201 initializes the second CAM conversion unit 104. In this step, the CPU 201 loads an output viewing condition 110 and generates an inverse conversion definition of JCh values into XYZ values and a forward conversion definition of XYZ values into JCh values according to CIECAM02.

Next, in step S1405, the CPU 201 generates color gamut information of the input device (input color gamut information). In this step, the CPU 201 generates the input color gamut information based on the color gamut information generation data in RGB values which is obtained from the color gamut information generation management unit 106 and the color appearance space data in JCh values which is the color gamut information generation data in RGB values converted into the JCh values by the input conversion unit 101 and the first CAM conversion unit 102.

The color gamut information includes the primary ramp information illustrated in FIG. 18. Further, the color gamut information includes the gamut boundary description (GBD), RGBCMYWK primary color data, and gray line gradation data.

If the device values of the input device use 8-bit RGB values, the color gamut information is generated, for example, according to the following processing. In the RGB color space, a boundary of its color gamut has R, G, or B with a data value of either 0 or 255. Accordingly, the CPU 201 converts representative values having R, G, or B with a data value of 0 or 255 into JCh values using the conversion definition of RGB values into XYZ values generated in step S401 and the conversion definition of RGB values into JCh values generated in step S1403. Using the collected groups of JCh values, the CPU 201 generates a polyhedron representing the color gamut.

Next, in step S1406, the CPU 201 generates color gamut information of the output device (output color gamut information). In this step, the CPU 201 generates the input color gamut information based on the color gamut information generation data in CMYK values which is obtained from the color gamut information generation management unit 106 and the color appearance space data in JCh values which is the color gamut information generation data in CMYK values converted into the JCh values by the output conversion unit 105 and the second CAM conversion unit 104.

Next, in step S1407, the CPU 201 initializes the color gamut mapping unit 103. According to the present exemplary embodiment, the CPU 201 loads the primary color/secondary color compensation control flag and determines whether to perform the primary color/secondary color compensation. Next, the CPU 201 loads the color gamut mapping information 109 as well as the input color gamut information and the output color gamut information sent from the color gamut information generation management unit 106.

If the primary color/secondary color compensation control flag is "OFF" (primary color/secondary color compensation is not to be performed), then the CPU 201 generates a normal mapping definition used for mapping the input JCh values in a color gamut of the output device.

If the primary color/secondary color compensation control flag is "ON", the CPU 201 loads the primary color/secondary color filter described in the color gamut mapping information 109 and generates a mapping definition used for mapping the input JCh values in the color gamut of the output device based on the input color gamut information and the output color gamut information. With respect to the input of the primary color or the secondary color specified by the primary color/secondary color filter, the CPU 201 generates a compensation mapping definition used for mapping the output of the corresponding primary color or the secondary color based on the primary ramp information of the input and output devices. Further, as for input of a color other than the primary color or the secondary color, the CPU 201 generates a normal mapping definition. The normal mapping definition in this case takes continuity of the mapping result of the primary color or the secondary color into consideration. Furthermore, the CPU 201 transmits the value of the primary color/secondary color filter to the input conversion unit 101.

In this way, the primary color/secondary color which is to be compensated is known before the mapping processing is performed since the primary color/secondary color filter information is described in the color gamut mapping information 109. Accordingly, an appropriate mapping definition that takes the continuity into consideration can be generated by the color gamut mapping unit 103. The primary color/secondary color filter of the present exemplary embodiment may be specified externally, for example, by an application instead of the color gamut mapping information 109.

Figure 15:
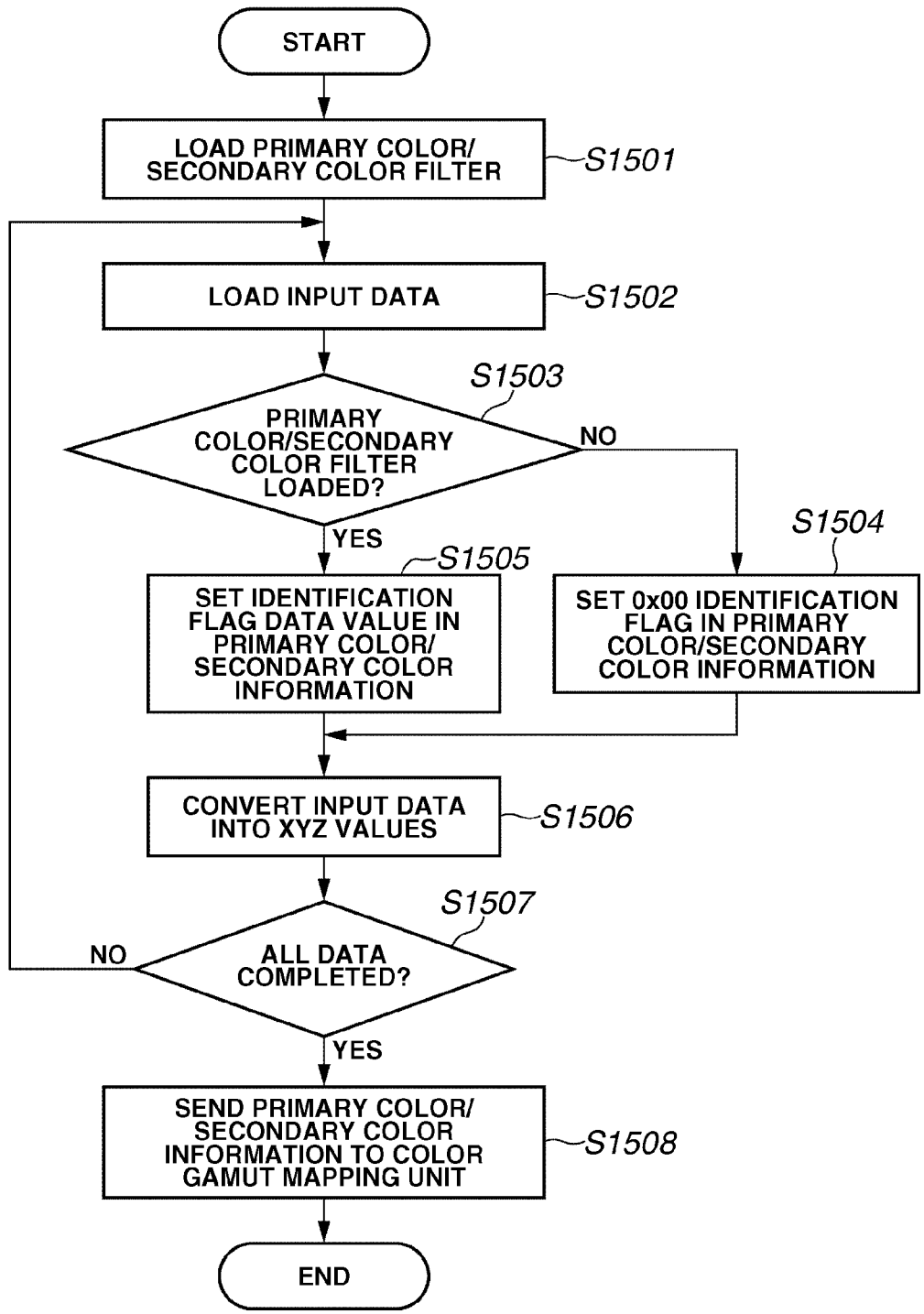
FIG. 15 illustrates detailed processing of step S1408 in FIG. 14.

Next, in step S1408, the CPU 201 converts the input data in RGB values which is to be color-matched, into XYZ values by the input conversion unit 101. Details of processing of step S1408 are illustrated in FIG. 15 and described below. Next, in step S1409, the CPU 201 converts all the data in XYZ values which are input into data, into JCh values by the first CAM conversion unit 102.

Figure 16:
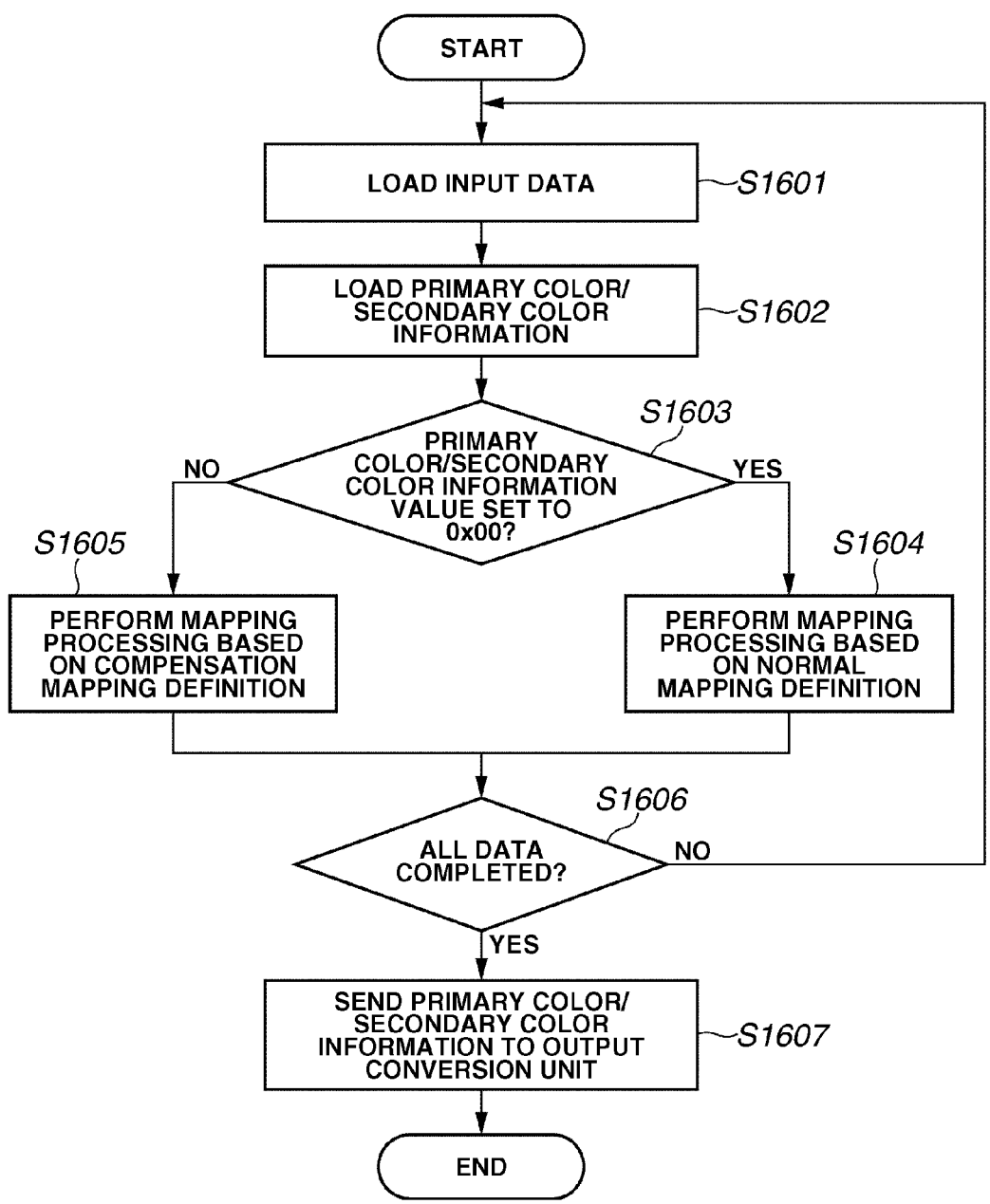
FIG. 16 illustrates detailed processing of step S1410 in FIG. 14.
Figure 17:
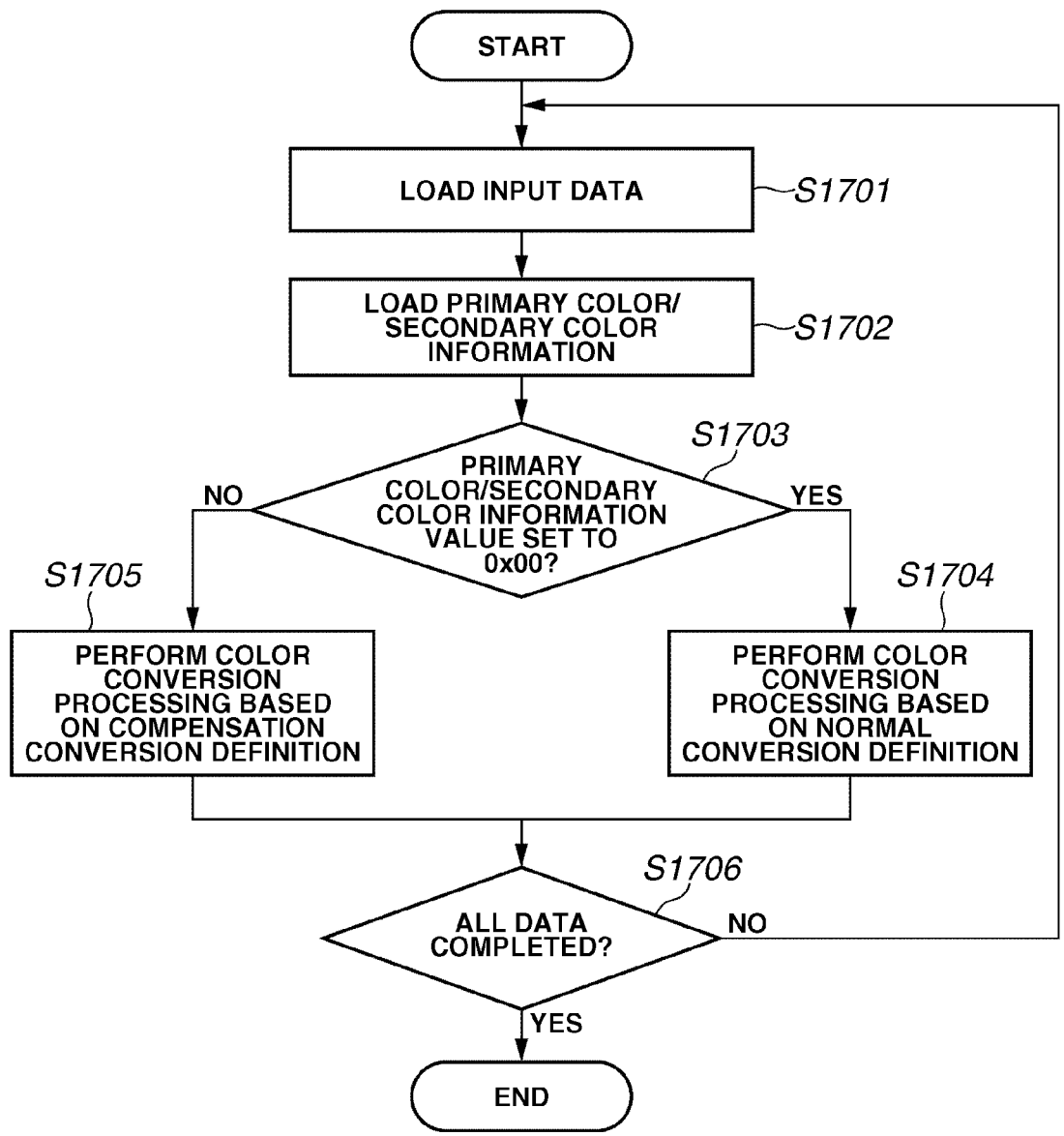
FIG. 17 illustrates detailed processing of step S1412 in FIG. 14.

Next, in step S1410, the CPU 201 executes the color gamut mapping of the JCh values within the color gamut of the output device by the color gamut mapping unit 103. Details of processing of step S1410 are illustrated in FIG. 16 and described below. Next, in step S1411, the CPU 201 converts all the data in JCh values which are input into data, into XYZ values by the second CAM conversion unit 104. Next, in step S1412, the CPU 201 converts the data in XYZ values into output data in CMYK values by the output conversion unit 105 and then the processing ends. Details of processing of step S1412 are illustrated in FIG. 17 and described below.

FIG. 15 is a flowchart illustrating detailed processing of step S1408 in FIG. 14.

In step S1501, the CPU 201 loads the primary color/secondary color filter transmitted from the color gamut mapping unit 103. In step S1502, the CPU 201 loads input data for one color to be color-matched.

In step S1503, the CPU 201 refers to the primary color/secondary color filter loaded in step S1501. If the primary color/secondary color filter is transmitted from the color gamut mapping unit 103 (YES in step S1503), the primary color/secondary color control flag is "ON" and the primary color/secondary color compensation is to be performed. The process proceeds to step S1505. If the filter is not transmitted from the color gamut mapping unit 103 (NO in step S1503), since the primary color/secondary color control flag is "OFF" and the primary color/secondary color compensation is not to be performed, the process proceeds to step S1504.

In step S1504, the CPU 201 sets an identification flag of 0x00 (None) in the primary color/secondary color information, and then the process proceeds to step S1506.

In step S1505, according to the values of the input data loaded in step S1502, the CPU 201 sets the data values of the primary color/secondary color identification flag 401 illustrated in FIG. 4 as the primary color/secondary color information. The setting of the data values of the primary color/secondary color identification flag 401 is based on the decision trees illustrated in FIGS. 6 through 13.

In step S1506, the CPU 201 converts the input data in RGB values into data in XYZ values based on the conversion defined in step S1401.

In step S1507, the CPU 201 determines whether conversion of all the input data is performed. If the conversion of all the input data is not completed (NO in step S1507), then the process returns to step S1502. If all the data is converted (YES in step S1507), then the process proceeds to step S1508.

In step S1508, the CPU 201 transmits the primary color/secondary color information which is set to the color gamut mapping unit 103, and then the process ends.

FIG. 16 is a flowchart illustrating detailed processing of step S1410 in FIG. 14. In step S1601, the CPU 201 loads the input data in JCh values for one color. Next, in step S1602, the CPU 201 loads the primary color/secondary color information corresponding to the input data. The primary color/secondary color information is generated in step S1408.

Next, in step S1603, the CPU 201 refers to the value of the primary color/secondary color information loaded in step S1602. If the value is "0x00" (None) (YES in step S1603), then the process proceeds to step S1604 and the CPU 201 performs the mapping processing according to the normal mapping definition. If the value is not "0x00" (NO in step S1603), the primary color/secondary color will be compensated, and the process proceeds to step S1605. In step S1605, the CPU 201 performs the mapping processing according to the mapping definition for compensation according to the value of the primary color/secondary color information.

Next, in step S1606, the CPU 201 determines whether all the input data is converted. If conversion of all the input data is not completed (NO in step S1606), then the process returns to step S1601. If conversion of all the input data is completed (YES in step S1606), then the process proceeds to step S1607.

In step S1607, the CPU 201 transmits the primary color/secondary color information which is set to the output conversion unit 105 and the processing ends.

FIG. 17 is a flowchart illustrating detailed processing of step S1412 in FIG. 14. First, in step S1701, the CPU 201 loads the input data in XYZ values for one color.

Next, in step S1702, the CPU 201 loads the primary color/secondary color information that matches the input data. This primary color/secondary color information is generated in step S1408.

Next, in step S1703, the CPU 201 refers to the primary color/secondary color information loaded in step S1702. If the value is "0x00" (None) (YES in step S1703), then in step S1704, the CPU 201 converts the XYZ values into CMYK values according to the color conversion processing using the normal conversion definition. If the value is not "0x00" (NO in step S1703), then in step S1705, the CPU 201 executes the color conversion processing using the conversion definition for compensation according to the value of the primary color/secondary color information.

Next, in step S1706, the CPU 201 determines whether all the data is converted. If conversion of all the input data is not completed (NO in step S1706), then the process returns to step S1701. If conversion of all the input data is completed (YES in step S1706), then the process ends.

As described above, identification information according to the value of the primary color/secondary color is applied to input data which is to be color matched, and dynamic color gamut mapping processing and output conversion processing are performed by a mechanism which transmits the information to the color gamut mapping unit and the output conversion unit according to the identification information. When the primary color/secondary color compensation is performed, the color gamut mapping processing is performed using the primary ramp information of the input device and the output device. In this way, color conversion processing considering color continuity with respect to an arbitrary combination of an input device and an output device can be appropriately performed without the need for preparing a plurality of profiles for one device when dynamically switching between application and non-application of the primary color/secondary color compensation.

According to the present exemplary embodiment, color conversion is applied to the conversion from RGB values of an input device, which is a monitor, into CMYK values of an output device which is a printer. However, the input and the output devices are not limited to such a combination. For example, CMYK values may be converted into RGB values.

Figure 19:
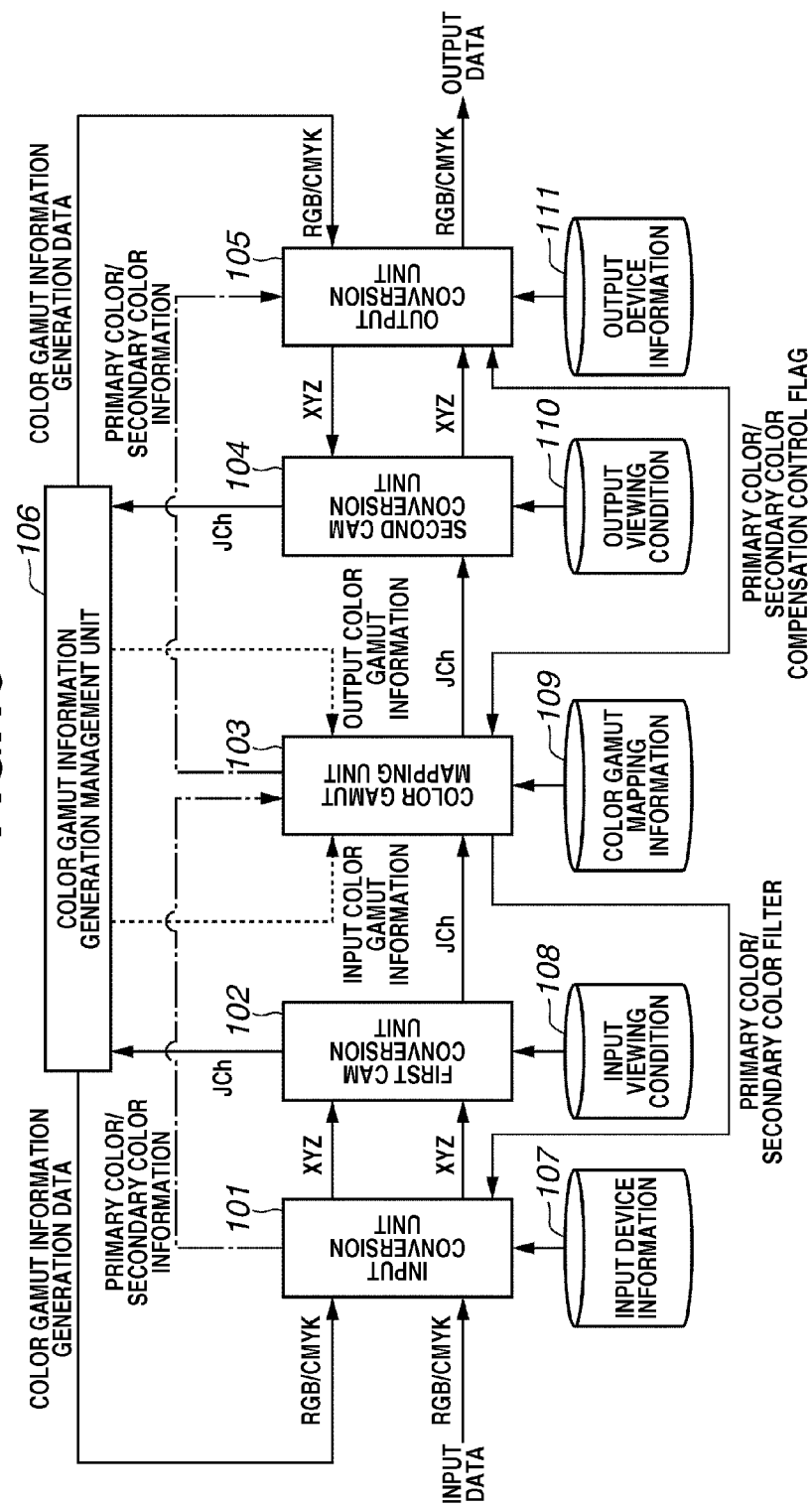
FIG. 19 is a block diagram illustrating an example of a system function configuration according to an exemplary embodiment of the present invention.

Further, the primary color/secondary color compensation can be controlled by an application according to the present exemplary embodiment or can be specified according to the primary color/secondary color compensation flag described in the output device information 111. In this case, the functional configuration illustrated in FIG. 1 is changed to the configuration illustrated in FIG. 19. The color compensation can be realized by loading the primary color/secondary color compensation flag described in the output device information in step S1402 of FIG. 14 and transmitting the loaded primary color/secondary color compensation flag to the color gamut mapping unit 103.

Further, according to the present exemplary embodiment, the compensation is applied to the primary color/secondary color. However, the compensation may also be applied to other colors using the identification flag illustrated in FIG. 4. For example, compensation can be applied to gradation data color (for example, "K-Y" or "K-Y-G", etc.) which is a color between black and RGBCMY (red, green, blue, cyan, magenta, yellow) primary colors. In this case, for example, the primary color/secondary color filter or the primary ramp information including black color as illustrated in FIGS. 20 and 21 can be used in place of the primary color/secondary color filter in FIG. 5 or the primary ramp information in FIG. 18.

A primary color/secondary color filter illustrated in FIG. 20 is the primary color/secondary color filter illustrated in FIG. 5 to which twelve types of filters related to black (K) are added. Further, the primary ramp information in FIG. 21 is the primary ramp information in FIG. 18 to which primary ramp information from black to blue ((R, G, B)=(0, 0, 0) to (0, 0, 255)) is added. Further, the color between white and black (W-K) is a gray line. In this case, gray compensation (or black-printing compensation) will be applied.

Next, a second exemplary embodiment will be described. Since the difference between the first and the second exemplary embodiments is the type of the primary color/secondary color identification flag and the processing performed at the color gamut mapping unit 103 and the output conversion unit 105, detailed description will not be repeated about the processing similar to the first exemplary embodiment.

The second exemplary embodiment is effective, for example, in the following case. For example, suppose a hue needs to be arbitrarily changed in a secondary color range after the secondary color compensation is specified. Here, for example, the secondary color which is specified by the primary color/secondary color filter is "W-Y-R". From the viewpoint of maintaining gradation between surrounding colors and the accurate color reproduction of the mapping processing as much as possible, in some cases, it is desirable to adjust the hue in the range of the secondary color. In this case, the following processing is performed. First, yellow ("W-Y"), which is the primary color, is mapped in the hue of yellow of the output device. Then, as for the color red "W-R", which is the secondary color or the color of the area surrounded by "W-R-Y", the color is not mapped in a matching portion of the output device but mapped within a range of the secondary color presented by yellow and magenta.

In this case, the color which is specified as red "W-R" or "W-Y-R" is mapped in the area between the yellow hue and the magenta hue including "W-Y-R", "W-R", and "W-R-M". Thus, the result of the mapping will be different from the result obtained by the specification of the primary color/secondary color information.

According to the present exemplary embodiment, in order to meet the above-described case, a process for updating the values of the primary color/secondary color information is performed by the color gamut mapping unit 103 according to the mapping result.

FIG. 22 illustrates an example of an identification flag or attribute information used for identifying the primary color or a secondary color according to the present exemplary embodiment. In FIG. 4, W, R, C, etc. of a primary color/secondary color identification flag 2201 denote the same in FIG. 3. The primary color/secondary color identification flag 2201 has a data value 2202 that matches each flag. The difference from the first exemplary embodiment in FIG. 4 is that, identification flags represented by four primary colors such as "W-M-R-Y", "K-M-R-Y", "W-Y-G-C", "J-Y-G-C", "W-C-B-M", and "K-C-B-M" are added to the present exemplary embodiment. For example, the identification flag "W-M-R-Y" represents a color which can be expressed by two colors, yellow and magenta. Its data value is "0xA3" (bit inclusive OR of data values of W, M, R, and Y). These identification flags are used when updating the transmitted primary color/secondary color information in the mapping processing by the color gamut mapping unit 103. Further, the output conversion unit 105 refers to these primary color/secondary color flags and appropriate color conversion processing is performed accordingly.

Figure 23:
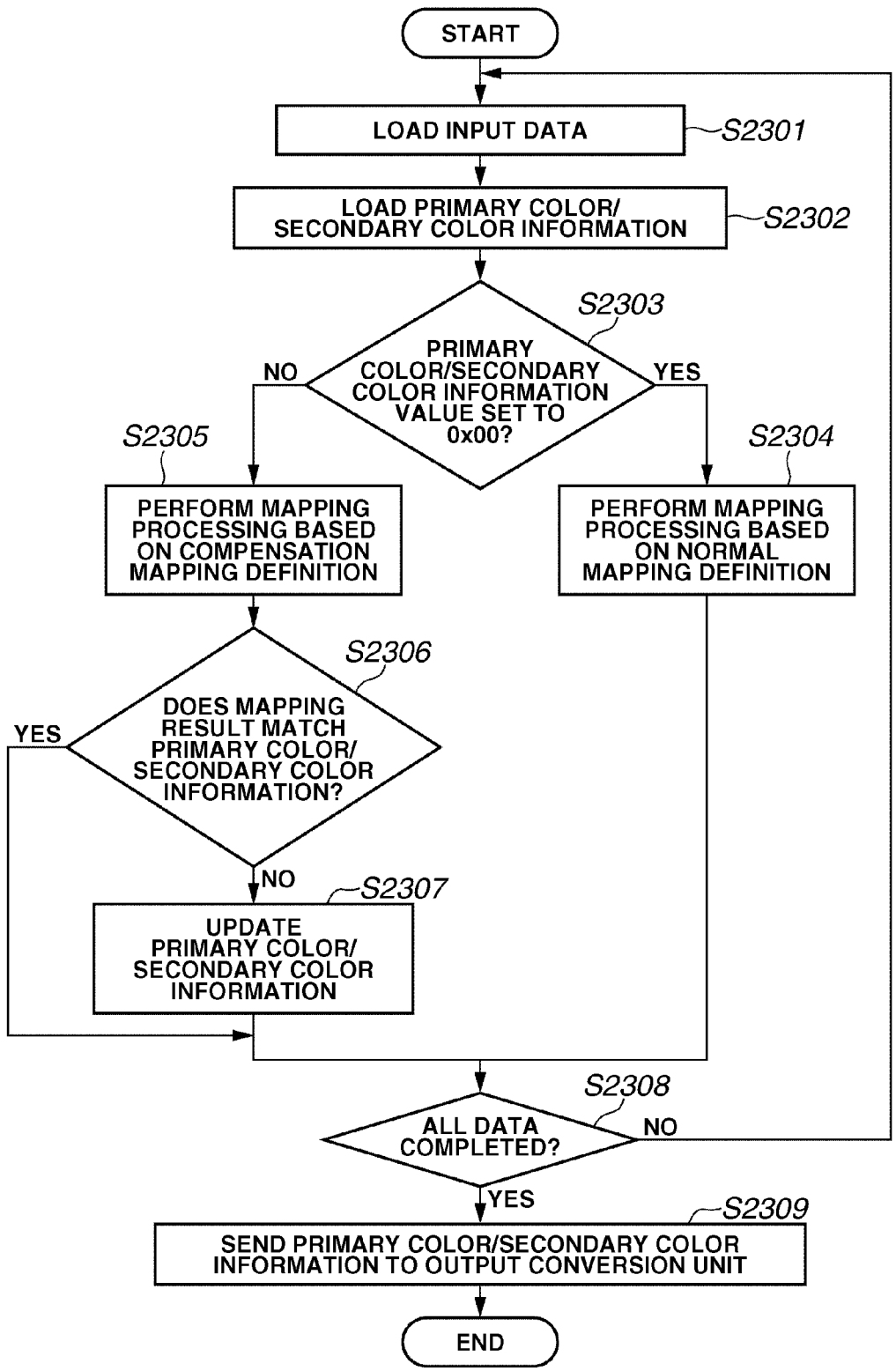
FIG. 23 illustrates detailed processing of step S1410 in FIG. 14 according to an exemplary embodiment of the present invention.
Figure 24:
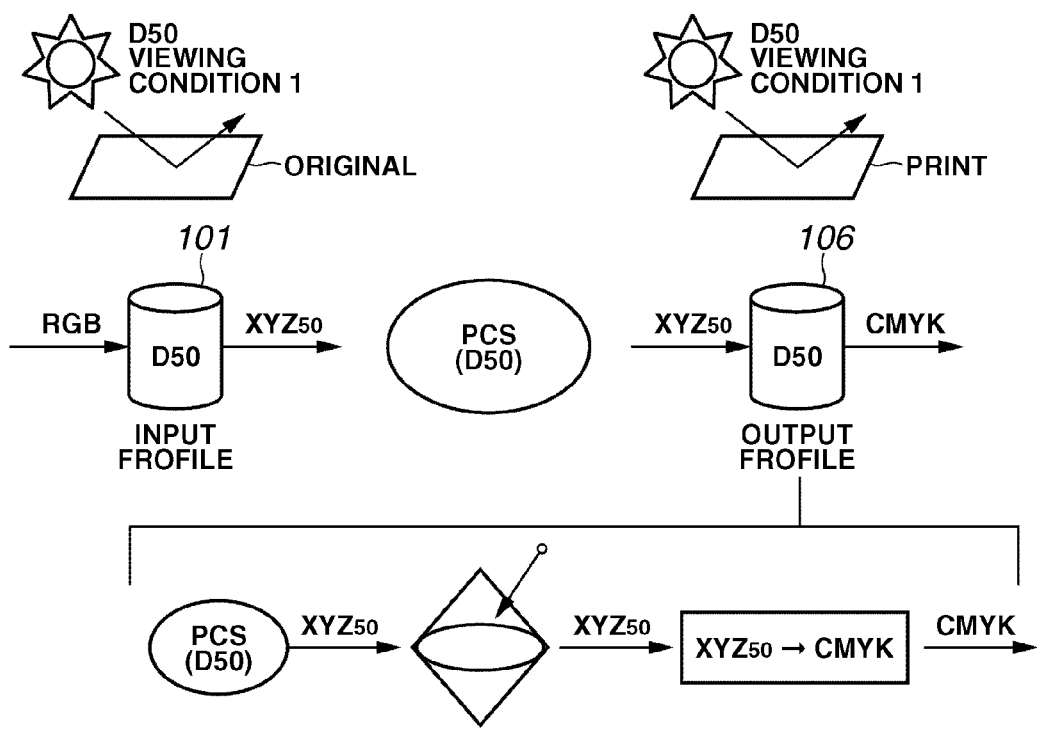
FIG. 24 illustrates conventional color matching processing.

FIG. 23 is a flowchart illustrating detailed processing of step S1410 in FIG. 14 according to the present exemplary embodiment. In step S2301, the CPU 201 loads the input data (JCh) for one color. Next, in step S2302, the CPU 201 loads the primary color/secondary color information corresponding to the input data.

Next, in step S2303, the CPU 201 refers to the primary color/secondary color information value loaded in step S2302 and determines whether the value is "0x00". If the value is "0x00" (None) (YES in step S2303), then the process proceeds to step S2304 and the CPU 201 performs the mapping processing according to the normal mapping definition. If the value is not "0x00" (NO in step S2303), the primary color/secondary color will be compensated and the process proceeds to step S2305. In step S2305, the CPU 201 performs the mapping processing according to the mapping definition for compensation according to the value of the primary color/secondary color information.

Next, in step S2306, the CPU 201 determines whether the mapping result matches the value of the primary color/secondary color information. If the value does not match (NO in step S2306), then in step S2307, the CPU 201 updates the value of the primary color/secondary color information based on the mapping result.

Next, in step S2308, the CPU 201 determines whether conversion of all the input data is completed. If the conversion of all the input data is not completed (NO in step S2308), then the process returns to step S2301. If all the data is converted (YES in step S2308), then the process proceeds to step S2309.

In step S2309, the CPU 201 transmits the primary color/secondary color information which is set, to the output conversion unit 105, and then the process ends.

According to the above-described processing, the value of the primary color/secondary color information can be updated according to the mapping result by the color gamut mapping unit 103.

In this way, the primary color/secondary color compensation processing can be performed in which fine gradation between a color which is subjected to the primary color/secondary color compensation processing, and its surrounding colors can be obtained while maintaining the mapping intention by the color gamut mapping unit 103 as much as possible.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-140561 filed May 28, 2007, which is hereby incorporated by reference herein in its entirety.

What is claimed is:

1. A color processing apparatus comprising:
   an input conversion unit configured to convert input data expressed in an input device-dependent color space into data expressed in a device-independent color space;
   a determination unit configured to determine an attribute of the input data and transmit a result of the determination to a color gamut mapping unit and an output conversion unit;
   wherein the color gamut mapping unit is configured to perform color gamut mapping on data expressed in the device-independent color space to data corresponding to color gamut information of an output device based on a result of the determination;
   wherein the output conversion unit is configured to convert the data which is subjected to the color gamut mapping into output data which is expressed in an output device-dependent color space based on a result of the determination; and
   wherein the attribute is information corresponding to a primary color or a secondary color.

2. The color processing apparatus according to claim 1, wherein the primary color or the secondary color is at least one color among yellow, cyan, magenta, red, green, and blue, and wherein the attribute indicates whether the input data is data of the primary color or the secondary color.

3. The color processing apparatus according to claim 1, wherein the attribute indicates whether the input data is data of a color gamut which is specified based on the primary color or the secondary color.

4. The color processing apparatus according to claim 1, wherein the determination unit receives information of the color to be determined from the color gamut mapping unit.

5. The color processing apparatus according to claim 1, wherein the color gamut information of the output device is a gamut boundary description of the output device, and the color processing apparatus further comprises a generation unit configured to generate the gamut boundary description of the output device using the output conversion unit.

6. The color processing apparatus according to claim 1, wherein the color gamut mapping unit updates a result of the determination and transmits the result to the output conversion unit.

7. A method comprising:
   converting input data expressed in an input device-dependent color space into data expressed in a device-independent color space;
   determining an attribute of the input data and transmitting a result of the determination to a color gamut mapping unit and an output conversion unit;
   performing color gamut mapping on data expressed in the device-independent color space to data corresponding to color gamut information of output device based on a result of the determination; and
   converting the data which is subjected to the color gamut mapping into output data which is expressed in an output device-dependent color space based on a result of the determination,
   wherein the attribute is information corresponding to a primary color or a secondary color.

8. A non-transitory computer-readable storage medium storing computer-executable instructions for realizing the method according to claim 7 by using a computer.

* * * * *